United States Patent [19]

Akiyama et al.

[11] Patent Number: 5,290,005
[45] Date of Patent: Mar. 1, 1994

[54] SUPPORTING DEVICE FOR MINIATURE MOTORS

[75] Inventors: Takeshi Akiyama; Shinichi Nakayama, both of Matsudo, Japan

[73] Assignee: Mabuchi Motor Co., Ltd., Chiba, Japan

[21] Appl. No.: 953,927

[22] Filed: Sep. 29, 1992

[30] Foreign Application Priority Data

Oct. 21, 1991 [JP] Japan ............................ 3-085602[U]

[51] Int. Cl.$^5$ .............................................. F16M 1/08
[52] U.S. Cl. .................................... 248/671; 248/300; 248/221.4; 248/316.1
[58] Field of Search ............. 248/643, 216.1, 681, 248/216.4, 674, 217.3, 221.4, 229, 230, 231.8, 676, 316.1, 316.2, 671, 643, 300, 546

[56] References Cited

U.S. PATENT DOCUMENTS

| | | | |
|---|---|---|---|
| 2,598,836 | 6/1952 | Schale | 248/671 |
| 2,810,536 | 10/1957 | Cunningham | 248/671 |
| 2,882,002 | 4/1959 | Seely | 248/316.1 X |
| 3,058,714 | 10/1962 | Oliver | 248/316.1 X |
| 3,931,946 | 1/1976 | Soltysik | 248/221.4 X |
| 4,032,099 | 6/1977 | Maude | 248/188.2 |
| 4,040,589 | 8/1977 | McLay | 248/217.3 X |
| 4,297,668 | 10/1981 | Place | 248/229 X |
| 4,586,688 | 5/1986 | Hartman et al. | 248/223.1 X |
| 4,733,330 | 3/1988 | Tanaka et al. | 248/221.4 X |
| 5,080,319 | 1/1992 | Nielsen | 248/188.2 |
| 5,106,143 | 2/1992 | Soeters | 248/221.4 X |
| 5,150,868 | 9/1992 | Kaden | 248/343 |

Primary Examiner—David A. Scherbel
Assistant Examiner—Korie Chan
Attorney, Agent, or Firm—McGlew and Tuttle, P.C.

[57] ABSTRACT

A supporting device for miniature motors comprising a first member having a notched portion for supporting one miniature motor bearing convex part and a protruded portion for inserting into a hole provided on a miniature motor housing, a second member having a hole for inserting another miniature motor bearing convex part of a partly cut circular shape, a member for connecting the first member with the second member, and a handle member for expanding the distance the mutually opposing first and second members, in which these members are formed integrally and in such a manner as to have resiliency to hold the miniature motor between the mutually opposing first and second members.

5 Claims, 4 Drawing Sheets

SUPPORTING DEVICE FOR MINIATURE MOTORS

BACKGROUND OF THE INVENTION

This invention relates generally to a supporting system for miniature motors, and more particularly to a support system for miniature motors for fixedly fitting a miniature motor, as used for drive units for models, materials for handicraft and science lessons, to a motor mount.

DESCRIPTION OF THE PRIOR ART

FIGS. 1 and 2 are a plan view and a side view illustrating an example of a miniature motor supporting device (hereinafter referred to as supporting device in short) of conventional types, FIG. 3 is a front view illustrating the state where a miniature motor is installed. This supporting device comprises a fixing device 30 and a screw 31. The fixing device 30 comprises a portion 33 on which a miniature motor 10 is placed, a portion 34 for receiving a convex part of a miniature motor bearing, and a portion 35 for screwing the miniature motor 10 to the fixing device 30, as shown in FIGS. 1 and 2. The miniature motor 10 is placed on the portion 33 in the state where one bearing convex part is inserted into a hole on the part 34, as shown in FIG. 3, and fixedly fitted to the fitting device 30 by fastening the screw 31 into the hole on the portion 35. The fixing device 30 is fitted to a motor mount (not shown) with four screws.

FIGS. 4 and 5 are a side view and a front view illustrating another example of miniature motor supporting device of a conventional type, FIG. 6 is a diagram of assistance in explaining a screw and a nut, FIG. 7 is a perspective view illustrating the state where a miniature motor is installed on the supporting device. This supporting device comprises two independent fixing devices 40, a screw 41 and a nut 42. The fixing devices 40 are used in a pair, with the recessed parts facing with each other, as shown in FIG. 4. The miniature motor 10 is placed in an almost cylindrical part formed by a recess defined by a pair of the fixing devices 40, and fixedly fitted to the fixing devices 40 by fastening the upper part of the fixing devices 40 with the screw 41 and the nut 42. Each of the fixing devices 40 is fastened to a motor mount (not shown) with two screws.

The prior-art miniature motor supporting devices shown in FIGS. 1 through 7 have problems in requiring time and labor in installing and removing the miniature motor 10 because the screw 31 or 41 is used. Furthermore, the use of the screws 31 or 41 requires a screw driver and other hand tools, leading to poor workability, and the difficulty in handling by users due to the increased number of parts.

Moreover, in a supporting device shown in FIGS. 1 through 3, the repeated mounting and dismounting of the miniature motor 10 to and from the fixing device 30 could unwantedly increase the size of a hole provided on the miniature motor 10 to which the screw 31 is fastened. This would result in imperfect installation of the miniature motor 10 to the fixing device 30.

SUMMARY OF THE INVENTION

It is an object of this invention to provide a miniature motor supporting device in which the miniature motor can be easily mounted and dismounted, the motor can be installed at any desired position, and a small number of parts are required.

DETAILED DESCRIPTION OF THE EMBODIMENTS

FIGS. 8 through 11 are a front view, a left side view, a right side view and a bottom view, respectively, illustrating an embodiment of this invention.

Figure 1:
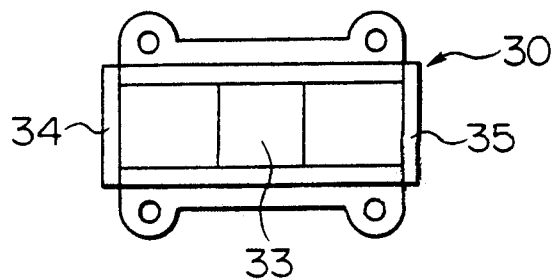
FIGS. 1 and 2 are a plan view and a side view illustrating an example of a miniature motor of a conventional type.
Figure 2:
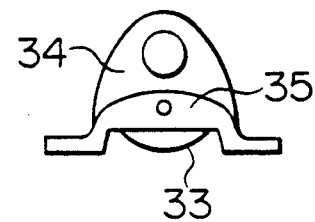
Figure 3:
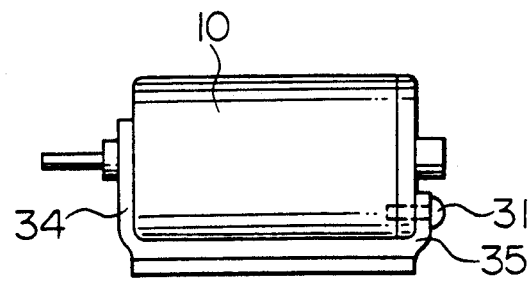
FIG. 3 is a front view illustrating the state where a miniature motor is installed.
Figure 4:
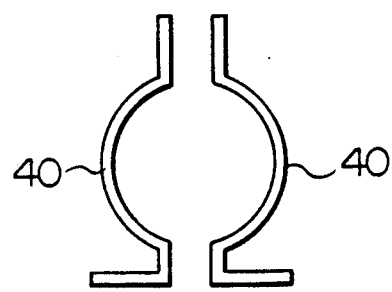
FIGS. 4 and 5 are a side view and a front view, respectively, illustrating another example of a miniature motor supporting device of a conventional type.
Figure 5:
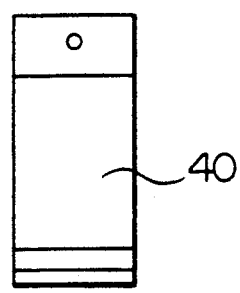
Figure 6:
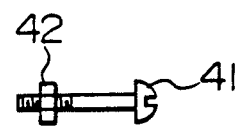
FIG. 6 is a diagram showing a screw and a nut.
Figure 7:
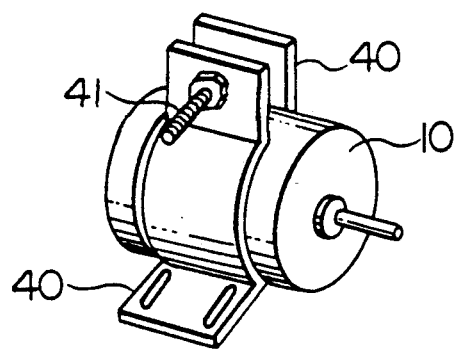
FIG. 7 is a perspective view illustrating the state where a miniature motor is installed.
Figure 8:
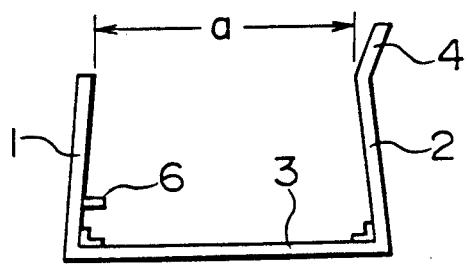
FIGS. 8 through 11 are a front view, a left side view, a right side view and bottom view, respectively, illustrating an embodiment of this invention.

This supporting device has a first member 1 and a second member 2, both facing each other, as shown in FIG. 8. The distance between the first member 1 and the second member 2 is a distance a at the upper part, and a slightly wider distance at the lower part. The first member 1 and the second member 2 are connected by being integrally and continuously formed with a connecting member 3 constituting the bottom of the supporting device. By integrally forming these members 1, 2 and 3, this supporting device is given resiliency with respect to a force exerting in such a direction as to expand the distance a between the first member 1 and the second member 2 (in the horizontal direction in FIG. 8). Note that these members 1, 2 and 3 should preferably be formed by pressing means using a material having resiliency, such as steel sheets.

Figure 9:
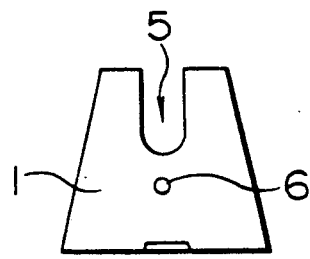

The typical shape of the first member 1 is shown in FIG. 9. That is, the first member 1 has a notched portion 5 for supporting any one of the convex part of the miniature motor bearing, and a protruded portion 6 inserted into a hole of the miniature motor housing. The protruded portion 6 is formed by embossing the first member 1. The notched portion 5 has such as shape as shown in the figure to be easily matched with the convex part of the bearing. The first member 1 as a whole is of an almost trapezoidal shape.

Figure 10:
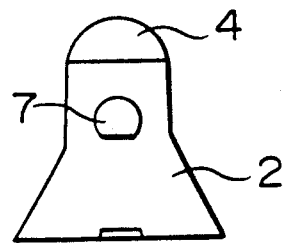

The typical shape of the second member 2 is shown in FIG. 10. That is, the second member 2 has a hole 7 for receiving another miniature motor convex part having a partly cut circular shape. The hole 7 also has a circular shape that is partly cut at the lower part thereof, as shown in the figure. The shape of the hole may be different, of a circular shape that is partly cut at the upper part thereof, for example, depending on the type of miniature motor. The second member 2 has a width at the part of the hole 7 narrower than the other parts thereof so as to draw the input terminals of the miniature motor to the outside.

The upper end of the second member 2 is bent to form a handle member 4, as shown in FIG. 8. The direction in which the handle member 4 is bent is opposite to the opposing first member 1. By forming in this manner, the distance a between the first member 1 and the second member 2 can be easily expanded by pushing the handle member 4. The handle member 4, which is formed by bending the second member 2, is integral with the second member 2.

Figure 11:
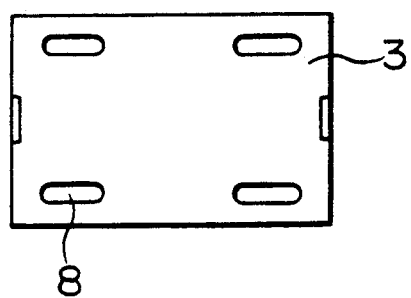

The typical shape of the connecting member 3 is shown in FIG. 11. That is, the connecting member 3 has a rectangular shape of almost the same width as the width of the miniature motor, and four screw holes 8. This supporting device is fastened to the motor mount using these screw holes 8 with screws.

Figure 12:
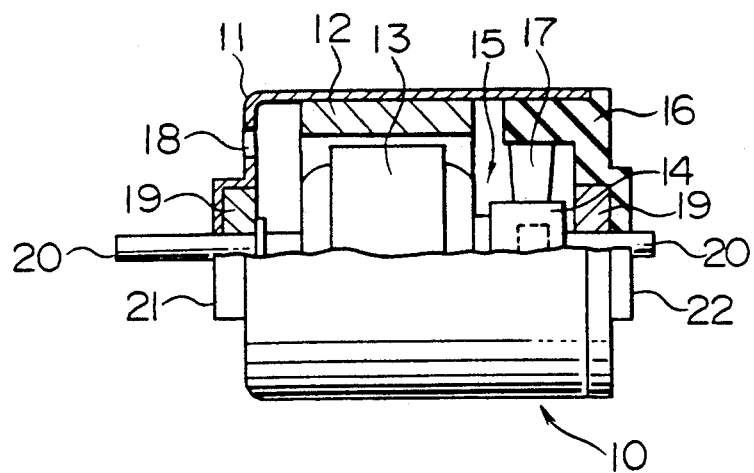
FIGS. 12 through 14 are a cross-sectional front view, a left side view and a right side view, respectively, illustrating an example of a miniature motor that can be installed on the supporting device shown in FIGS. 8 through 11.
Figure 13:
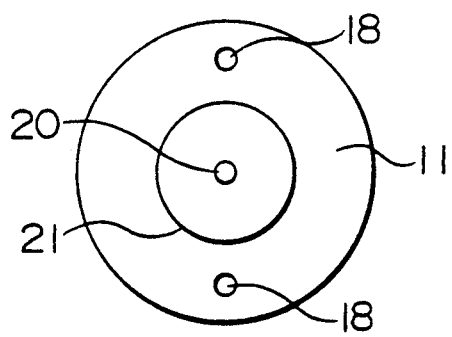
Figure 14:
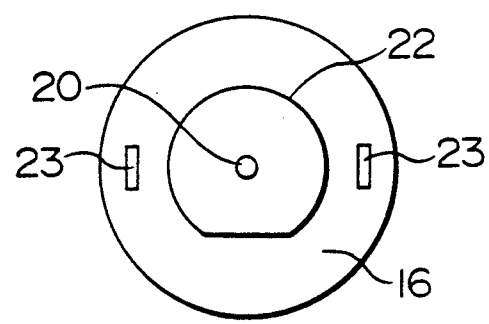

FIGS. 12 through 14 are a cross-sectional view, a left side view and a right side view illustrating an example of a miniature motor installed on the supporting device shown in FIGS. 8 through 11. In FIG. 12, a housing 11 is made of a metallic material, such as mild steel, and formed into a bottomed hollow cylindrical shape. A permanent magnet 12 of an arc-segment shape, for example, is fixedly fitted to the inner circumferential surface of the housing 11. In the housing 11, provided is a rotor 15 consisting of an armature 13 facing the permanent magnet 12 and a commutator 14. A motor case 16 is made of a resin, and fitted to an opening of the housing 11. Brushes 17 are provided so as to make sliding contact with the commutator 14, and connected electrically to input terminals. The input terminals are provided in such a manner that the input terminals are inserted into the motor case 16 so as to protrude toward the outside of the motor case 16. Bearings 19 are provided in bearing convex parts (bearing retainers) 21 and 22 formed by causing the bottom of the housing 11 and the motor case 16 to protrude, and support a rotating shaft 20 fixedly fitted to the rotor 15.

As shown in FIGS. 12 and 13, two through-holes 18 are provided by drilling the housing 11. The hole 18 are provided in advance to fasten the miniature motor 10, for example. In this embodiment, the lower one of the holes 18 shown in FIG. 13 is also used to receive the protruded portion 6.

As shown in FIGS. 12 and 14, the bearing convex parts 21, 22 on the side of the motor case 16 (on the opposite side to the bearing convex parts 21 having the hole 18) among the two bearing convex parts 21 and 22 is of a circular shape that is partly cut at the lower part thereof. This cut portion is provided in advance to position the miniature motor 10 (to position taking into account the polarity of the input terminals). In this embodiment, this shape is also used to insert the convex part into the hole 7 of the supporting device. On both sides of the bearing convex part 22, protruded are the input terminals 23.

The miniature motor 10 drives external equipment (not shown) via the rotating shaft 20 as current is fed to the armature 13 via the input terminals 23, the brushes 17 and the commutator 14 to impart rotating force to the armature 13 present in a magnetic field formed by the permanent magnet 12 fixedly fitted to the inner circumferential surface of the housing 11.

Figure 15:
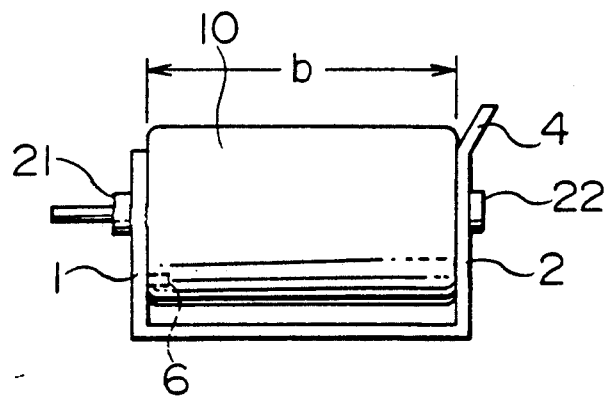
FIGS. 15 through 17 are a front view, a left side view and a right side view, respectively, illustrating the state where the miniature motor shown in FIGS. 12 through 14 are installed on the supporting device shown in FIGS. 9 through 11.
Figure 16:
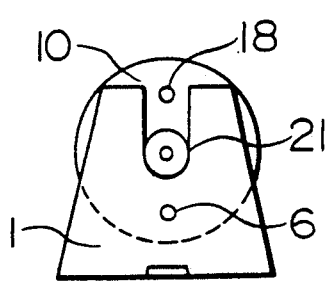
Figure 17:
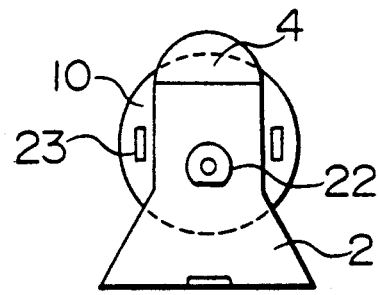

FIGS. 15 through 17 are a front view, a left side view and a right side view illustrating the state where the miniature motor shown in FIGS. 12 through 14 is installed on the supporting device shown in FIG. 9 through 11.

The miniature motor 10 is first forced onto the supporting device downward from the top in FIG. 15, pushing in between the gap between the first member 1 and the second member 2 while slightly expanding the distance a between the first member 1 and the second member 2. At this point of time, the protruded portion 6 is inserted into the hole 18 while sliding the bearing convex part 21 on the side of the housing 11 along the notched portion as a guide. The bearing convex part 22 on the side of the motor case 6 is inserted into the hole 7.

Thus, the miniature motor 10 is fixedly fitted to the supporting device, as shown in FIGS. 15 through 17. The distance b between the first member 1 and the second member 2 in this state is made larger than the original distance a. With this, a force is exerted to push the miniature motor 10 between the first member 1 and the second member 2. That is, a kind of leaf spring is formed by the first member 1, the second member 2 and the connecting member 3. By the resiliency of this leaf spring, the miniature motor 10 is fixed more tightly.

By using the hole 18 of the housing 11 and the bearing convex part 22 on the side of the motor case 16, the miniature motor 10 can be accurately and easily positioned at a desired position. By engaging the first member 1 and the second member 2 with the hole 18 and the bearing convex part 22, the miniature motor 10 is effectively prevented from being moved from its predetermined position.

In this way, this invention is easy and simple in mounting or dismounting the miniature motor 10. That is, the bearing convex part 22 on the side of the motor case 16 is removed from the hole 7, while pushing the handle 4 in such a direction as to further expand the distance b. Then, as the bearing convex part 21 on the side of the housing 11 is moved along the notched portion 5, the protruded portion 6 is removed easily from the hole 18. Thus, the miniature motor 10 can be easily removed.

Figure 18:
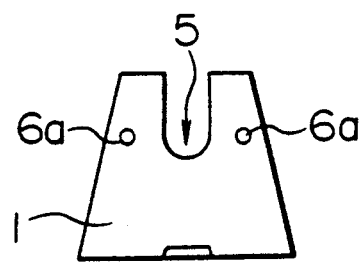
FIGS. 18 and 19 are a side view illustrating another embodiment of this invention, and a side view shown in the state where a miniature motor is installed.
Figure 19:
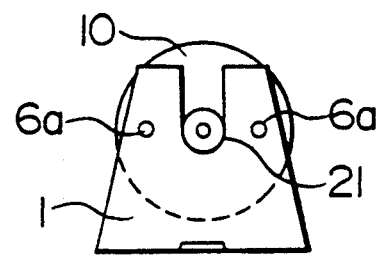

FIGS. 18 and 19 are a side view illustrating another embodiment of this invention and a side view showing the state where a miniature motor is installed on the supporting device of this invention. These figures correspond with FIGS. 9 and 16. As shown in FIGS. 18 and 19, two protruded portions 6a may be provided on the left and right sides of the notched portion 5. These two protruded portions 6a are engaged with the two holes 18 on the housing 11 of the miniature motor 10 shown in FIGS. 12 through 14. Whether the protruded portions 6a are provided as shown in FIG. 9, or as shown in FIGS. 18 and 19 depends on the circular notched position of the bearing convex part 22 on the motor case 16, and on the relative positions of the holes 18 on the side of the housing 11.

As described above, this invention makes the mounting and dismounting of miniature motors easy, eliminates the need for tools, reduces the number of parts, simplifies the construction of the miniature motor, and easily positions the miniature motor at a desired position since the miniature motor supporting device eliminates fastening screws by supporting the miniature motor by the resiliency of the integrally formed fixing device, and engages the hole of the motor housing and the motor case bearing convex part with the fixing device.

What is claimed is:

1. A miniature motor and supporting device, comprising:
    a miniature motor including a housing made of a metallic material, said housing being formed into a bottomed hollow cylindrical shape including an end with a hole and having permanent magnets fixedly fitted to an inner circumferential surface of said housing, a rotor positioned in said housing and including an armature facing said permanent magnets and including a commutator, and a motor case fitted to an opened end opposite said end of said housing and having brushes making sliding contact with said commutator and input terminals electrically connected to said brushes, said rotor being rotatably supported by bearings provided in bearing convex parts of said housing which include a first convex part formed in said end of said housing and a second convex part formed in said motor case; and
    supporting means for supporting said motor including;
    a first member having a notch portion for supporting said first convex part and a protruded portion, said protruded portion being inserted into said hole provided on said end of said housing;
    a second member having a second member hole receiving said second convex part, said second member hole being of a partially cut circular shape, said second convex part having an outer surface being of a partially cut circular shape complimentary to the partially cut circular shape of said second member hole;
    a connecting member connecting said first member and said second member such that said first member and said second member are in opposing relationship and having a distance therebetween; and
    a handle member connected to one of said first and second members whereby said first member, said second member, said connecting member, and said handle member being formed integrally; and
    whereby the first member and the second member having resiliency such that when said miniature motor is inserted between the opposing first and second members, said first and second members are flexed about the connecting member to accommodate the miniature motor.

2. The miniature motor and supporting device of claim 1 wherein said miniature motor has a length which is larger than said distance between said first member and said second member.

3. The miniature motor and supporting device of claim 1 wherein the protruded portion of said supporting means is disposed under said notch portion.

4. The miniature motor and supporting device of claim 2, wherein said protruded portion of said supporting means is provided on both sides of said notch portion.

5. A miniature motor and supporting device, comprising:
    a miniature motor including a housing made of a metallic material, said housing being formed into a bottomed hollow cylindrical shape including an end with a hole and having permanent magnets fixedly fitted to an inner circumferential surface of said housing, a rotor positioned in said housing and including an armature facing said permanent magnets and including a commutator, and a motor case fitted to an opened end opposite said end of said housing and having brushes making sliding contact with said commutator and input terminals electrically connected to said brushes, said rotor being rotatably supported by bearings provided in bearing convex parts of said housing which include a first convex part formed in said end of said housing and a second convex part formed in said motor case; and
    supporting means for supporting said motor including;
    a first member having a notch portion for supporting said first convex part and a protruded portion, said protruded portion being inserted into said hole provided on said end of said housing;
    a second member having a second member hole receiving said second convex part, said second convex part having an outer surface with a shape complimentary to a shape said second member hole;
    a connecting member connecting said first member and said second member such that said first member and said second member are in opposing relationship and having a distance therebetween; and
    a handle member connected to one of said first and second members whereby said first member, said second member, said connecting member, and said handle member being formed integrally; and
    whereby the first member and the second member having resiliency such that when said miniature motor is inserted between the opposing first and second members, said first and second members are flexed about the connecting member to accommodate the miniature motor.

* * * * *

REEXAMINATION CERTIFICATE (3612th)

United States Patent [19]

Akiyama et al.

[11] B1 5,290,005

[45] Certificate Issued Aug. 25, 1998

[54] SUPPORTING DEVICE FOR MINIATURE MOTORS

[75] Inventors: Takeshi Akiyama; Shinichi Nakayama, both of Matsudo, Japan

[73] Assignee: Mabuchi Motor Co., Matsudo, Japan

Reexamination Request:
No. 90/004,839, Nov. 14, 1997

Reexamination Certificate for:
Patent No.: 5,290,005
Issued: Mar. 1, 1994
Appl. No.: 953,927
Filed: Sep. 29, 1992

[30] Foreign Application Priority Data

Oct. 21, 1991 [JP] Japan ............................ 3-085602 U

[51] Int. Cl.$^6$ ...................................................... F16M 1/08
[52] U.S. Cl. ................... 248/671; 248/221.4; 248/316.1; 248/300
[58] Field of Search ....................... 248/643, 216.1, 248/681, 216.4, 674, 217.3, 221.4, 229, 230, 231.8, 676, 316.1, 316.2, 671, 300, 546; 310/40 MM

[56] References Cited

PUBLICATIONS

Hobbys, No. 1301—Nihon Mokei Shimbun Japan, Sep. 1991.
Toy Journal, No. 972 Japan, Oct. 1991.
Kids Life, Gangu Shoto, Japan, Oct. 1991.
Placing Toys Magazine, No. 685 Japan, Oct. 1991.
B–Young Age, No. 753 Japan, Oct. 1991.

*Primary Examiner*—Ramon O. Ramirez

[57] ABSTRACT

A supporting device for miniature motors comprising a first member having a notched portion for supporting one miniature motor bearing convex part and a protruded portion for inserting into a hole provided on a miniature motor housing, a second member having a hole for inserting another miniature motor bearing convex part of a partly cut circular shape, a member for connecting the first member with the second member, and a handle member for expanding the distance the mutually opposing first and second members, in which these members are formed integrally and in such a manner as to have resiliency to hold the miniature motor between the mutually opposing first and second members.

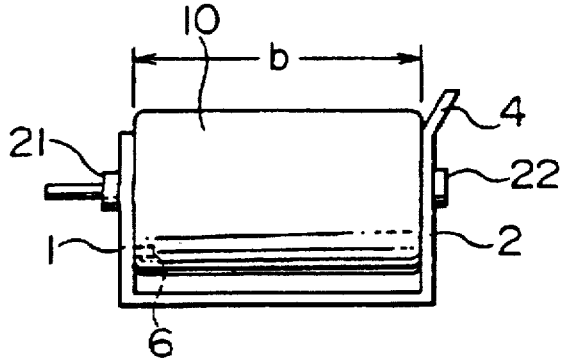

REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1–5 is confirmed.

* * * * *